(12) United States Patent
Chao et al.

(10) Patent No.: US 12,228,744 B2
(45) Date of Patent: Feb. 18, 2025

(54) ELECTRONIC DEVICE AND METHOD FOR GENERATING STEREOSCOPIC LIGHT-FIELD DATA

(71) Applicant: PetaRay Inc., New Taipei (TW)

(72) Inventors: Chun-Hao Chao, New Taipei (TW); Homer Chen, New Taipei (TW)

(73) Assignee: PETARAY INC., New Taipei (TW)

( * ) Notice: Subject to any disclaimer, the term of this patent is extended or adjusted under 35 U.S.C. 154(b) by 154 days.

(21) Appl. No.: 18/059,505

(22) Filed: Nov. 29, 2022

(65) Prior Publication Data

US 2023/0179754 A1 Jun. 8, 2023

Related U.S. Application Data

(60) Provisional application No. 63/286,036, filed on Dec. 4, 2021.

(51) Int. Cl.
| | | |
|---|---|---|
| G02B 27/30 | (2006.01) | |
| G02B 19/00 | (2006.01) | |
| G02B 27/01 | (2006.01) | |
| G02B 27/14 | (2006.01) | |
| G06T 7/557 | (2017.01) | |
| H04N 13/161 | (2018.01) | |
| H04N 13/282 | (2018.01) | |
| H04N 13/30 | (2018.01) | |

(52) U.S. Cl.
CPC ......... *G02B 27/30* (2013.01); *G02B 19/0028* (2013.01); *G02B 27/0172* (2013.01); *G02B 27/148* (2013.01); *G06T 7/557* (2017.01); *H04N 13/161* (2018.05); *H04N 13/282* (2018.05); *H04N 13/30* (2018.05); *G06T 2207/10052* (2013.01)

(58) Field of Classification Search
CPC ............ G02B 19/0028; G02B 27/0075; G02B 27/0172; G02B 27/148; G02B 27/30; G02B 30/22; G06T 2207/10052; G06T 7/557; H04N 13/106; H04N 13/111; H04N 13/139; H04N 13/156; H04N 13/161; H04N 13/282; H04N 13/30; H04N 2213/003
USPC ......................................................... 348/43
See application file for complete search history.

(56) References Cited

U.S. PATENT DOCUMENTS

| | | | |
|---|---|---|---|
| 2018/0091800 A1* | 3/2018 | Ratcliff | H04N 13/305 |
| 2019/0383913 A1* | 12/2019 | Crouch | G01S 17/34 |
| 2022/0124301 A1* | 4/2022 | Berendse | H04N 13/282 |
| 2022/0210397 A1* | 6/2022 | Kim | H04N 13/398 |

FOREIGN PATENT DOCUMENTS

| | | | | | |
|---|---|---|---|---|---|
| CN | 109118581 A | * | 1/2019 | | G06T 17/00 |
| CN | 109188803 A | * | 1/2019 | | G02B 30/26 |
| CN | 114137737 A | * | 3/2022 | | H04N 13/279 |
| KR | 20210045078 A | * | 4/2021 | | H04N 13/307 |
| TW | 201340724 A | * | 10/2013 | | H04N 13/161 |

* cited by examiner

*Primary Examiner* — Behrooz M Senfi
(74) *Attorney, Agent, or Firm* — McClure, Qualey & Rodack, LLP

(57) ABSTRACT

A method for generating stereoscopic light-field data is provided. The method includes the following steps: obtaining three-dimensional image data; performing a multi-view generation process to convert the three-dimensional image data into multi-view data; and performing a light-field conversion process to convert the multi-view data into a stereoscopic light-field pair.

6 Claims, 8 Drawing Sheets

ELECTRONIC DEVICE AND METHOD FOR GENERATING STEREOSCOPIC LIGHT-FIELD DATA

CROSS-REFERENCE TO RELATED APPLICATION

This application claims the priority benefits of U.S. Provisional application No. 63/286,036, filed on Dec. 4, 2021, the entirety of which is incorporated by reference herein.

BACKGROUND OF THE INVENTION

Field of the Invention

The present disclosure relates to image processing, and, in particular, to an electronic device and a method for generating stereoscopic light-field data.

Description of the Related Art

In recent years, light-field display technology has drawn wide attention in the 3-D (three-dimensional) display and AR (Augmented Reality)/VR (Virtual Reality) communities, because it can resolve the notorious vergence-accommodation conflict that causes nausea and dizziness to users of most existing stereoscopic displays.

The conventional 3-D displays provide 3-D sensation by presenting an image to each eye. In contrast, a light-field display presents a light field to each eye. More specifically, it takes light-field data as input, reproduces the light rays corresponding to the input, and projects them into the eyes. Light-field display is often referred to as the ultimate display since it provides users with a natural and comfortable visual experience.

BRIEF SUMMARY OF THE INVENTION

In accordance with one feature of the present invention, the present disclosure provides an electronic device. The electronic device includes a multi-view generation circuit and a light-field conversion circuit. The multi-view generation circuit is configured to obtain three-dimensional image data and convert the three-dimensional image data into multi-view data. The light-field conversion circuit is configured to convert the multi-view data into a stereoscopic light-field pair.

In one embodiment, the three-dimensional image data include a first texture image and its corresponding first depth image.

In one embodiment, the multi-view data include a second texture image and its corresponding second depth image. In further embodiments, the second texture image includes a plurality of sub-view images, and the corresponding second depth image includes a plurality of sub-depth images. Each of the sub-view images corresponds to one of the sub-depth images.

In one embodiment, the three-dimensional image data include a stereoscopic image pair consisting of a left image and a right image. Furthermore, the multi-view data include a left multi-view image and a right multi-view image.

In one embodiment, the multi-view data are arranged into a two-dimensional array having a vertical dimension and a horizontal dimension. The vertical dimension corresponds to a first angular resolution of the left multi-view image and the right multi-view image in a vertical direction. The horizontal dimension corresponds to a second angular resolution of the left multi-view image and the right multi-view image in a horizontal direction.

In one embodiment, the stereoscopic light-field pair includes a left light field and a right light field, and light-field conversion circuit transmits the left light field and the right light field to a light-field display. The light-field display displays the left light field and the right light field respectively on a left display panel and a right display panel of the light-field display.

In accordance with another embodiment of the present invention, a method for generating stereoscopic light-field data is provided. The method for generating stereoscopic light-field data includes the following steps: obtaining three-dimensional image data; performing a multi-view generation process to convert the 3-D image data into multi-view data; and performing a light-field conversion process to convert the multi-view data into a stereoscopic light-field pair.

In one embodiment, the stereoscopic light-field pair includes a left light field and a right light field, and the method further includes the following steps: transmitting the left light field and the right light field to a light-field display; and displaying the left light field and the right light field respectively on a left display panel and a right display panel of the light-field display.

According to yet another embodiment of the present disclosure, an electronic device is provided. The electronic device includes a processor configured to obtain three-dimensional image data, to perform a multi-view generation process to convert the three-dimensional image data into multi-view data, and to perform a light-field conversion process to convert the multi-view data into a stereoscopic light-field pair.

In one embodiment, the processor utilizes a graphics processing unit (GPU) to speed up the multi-view generation process.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "comprises," "comprising," "comprises" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1A:
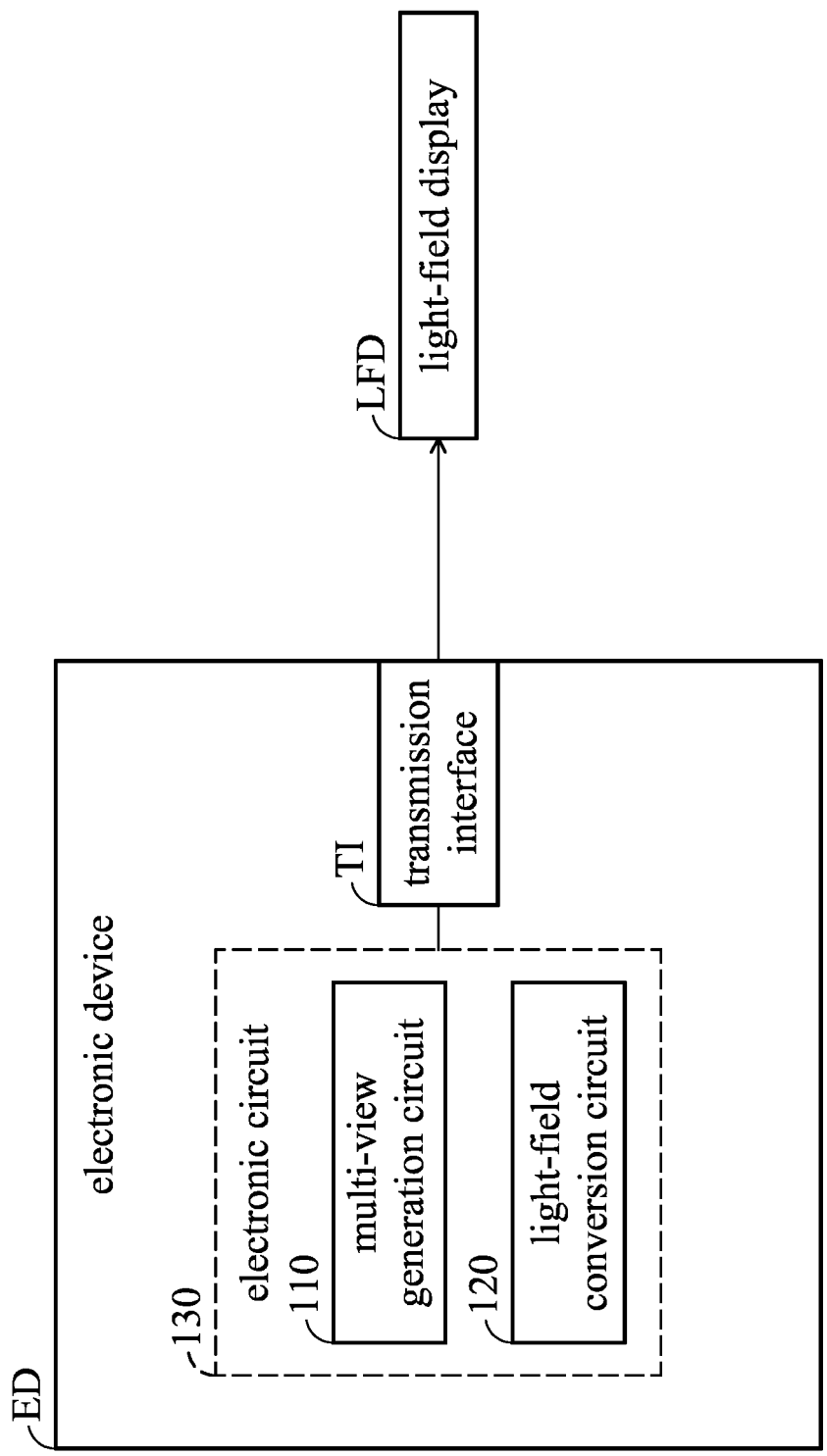
FIG. 1A is a block diagram of an electronic device in accordance with one embodiment of the present disclosure.

Please refer to FIG. 1A. FIG. 1A is a block diagram of an electronic device ED in accordance with an embodiment of the present disclosure.

In one embodiment, the electronic device ED includes an electronic circuit 130, and a transmission interface TI, as depicted in FIG. 1A. The electronic circuit 130 includes a multi-view generation circuit 110 and a light-field conversion circuit 120, where the details will be described later.

The transmission interface TI is configured to transmit signal and/or data to the light-field display LFD.

In some embodiments, the electronic device ED may be a standalone computing device such as a desktop computer, a server, a laptop computer, a smartphone, etc., but the disclosure is not limited thereto In some other embodiments, the electronic device ED may be disposed in the light-field display LFD that can be implemented in the form of a head-mounted display, or a pair of AR glasses, but the disclosure is not limited thereto.

Figure 1B:
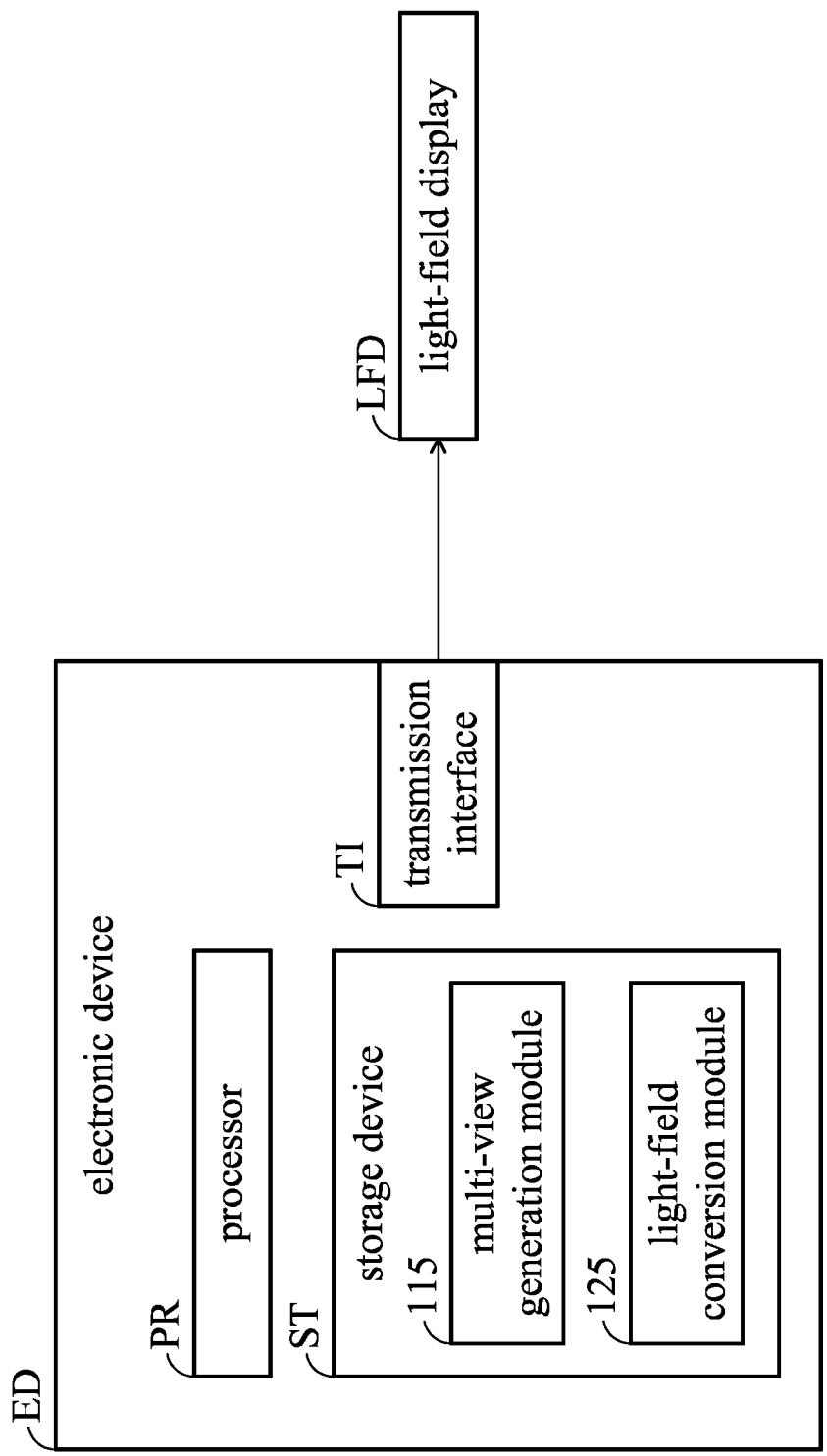
FIG. 1B is a block diagram of an electronic device in accordance with another embodiment of the present disclosure.

Please refer to FIG. 1B. FIG. 1B is a block diagram of an electronic device ED in accordance with another embodiment of the present disclosure.

In one embodiment, the electronic device ED includes a processor PR, a storage device ST, and a transmission interface TI. Similarly, the electronic device ED in FIG. 1B may be a standalone computing device such as a desktop computer, a server, a laptop computer, a smartphone, etc. Alternatively, the electronic device ED in FIG. 1B can be disposed in the head-mounted display, an AR device, or wearable glasses.

In one embodiment, transmission interface TI can be implemented by a wired or wireless communication interface. The transmission interface TI can be connected to a light-field display LFD.

In one embodiment, the storage device ST can be implemented as a read-only memory, a flash memory, a floppy disk, a hard disk, an optical disk, a flash drive, a magnetic tape, a database accessible by network, or storage media with the same features well-known in the art.

In one embodiment, the processor PR is used to perform various operations and the processor PR can be implemented using an integrated circuit such as a micro controller, a microprocessor, a digital signal processor, an application specific integrated circuit (ASIC), a central processing unit (CPU), or a logic circuit having equivalent functions.

In some embodiments, the storage device ST stores a multi-view generation module 115 and a light-field conversion module 125 which are software modules that can be executed by the processor PR to perform operations of a multi-view generation process and a light-field conversion process, respectively. In some other embodiments, the multi-view generation module 115 and the light-field conversion module 125 may be stored in an external computer or an external storage device (not shown in FIG. 1B).

Figure 2:
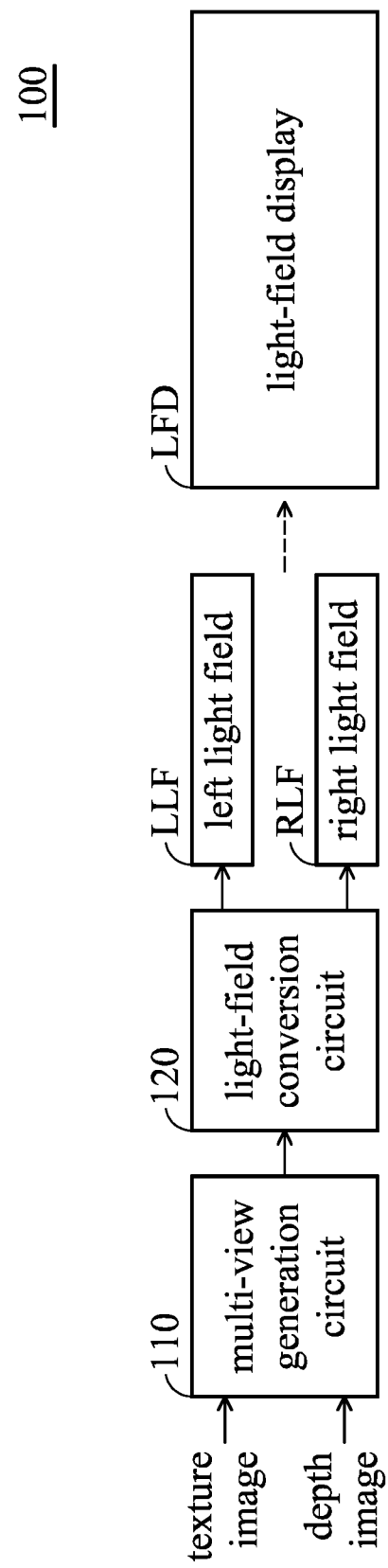
FIG. 2 is a diagram showing the flow for generating stereoscopic light-field data in accordance with one embodiment of the present disclosure.
Figure 3:
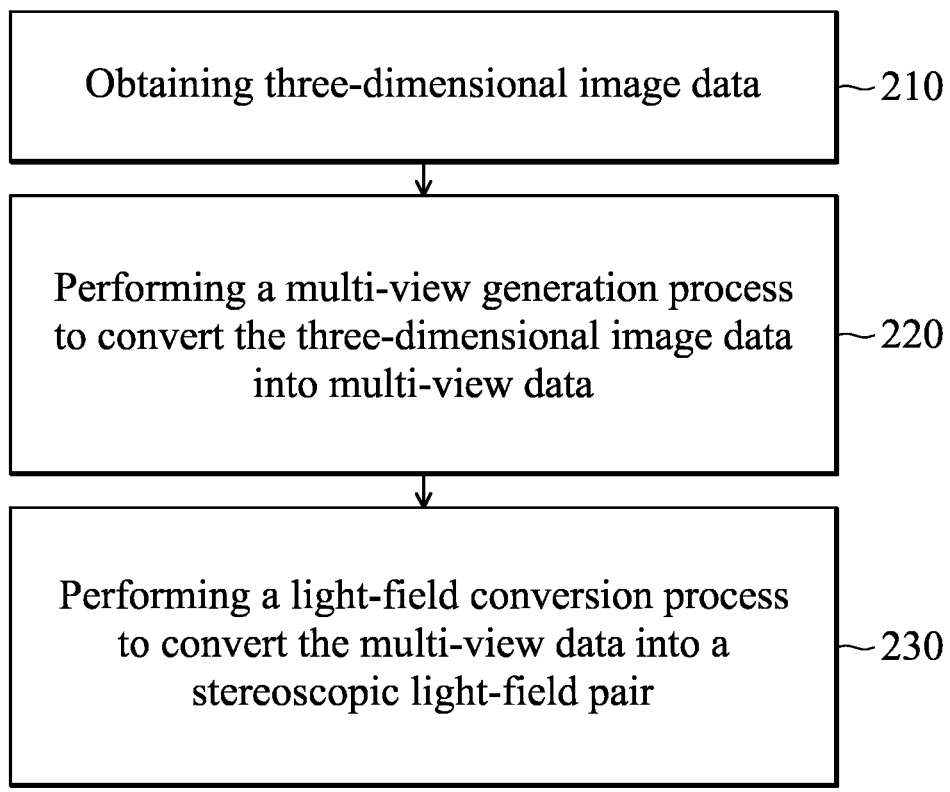
FIG. 3 is a flow chart of a method for generating stereoscopic light-field data in accordance with one embodiment of the present disclosure.

Please refer to FIGS. 1A~1B, FIG. 2, and FIG. 3. FIG. 2 is a diagram showing the flow 100 for generating stereoscopic light-field data in accordance with one embodiment of the present disclosure. FIG. 3 is a flow chart of a method 200 for generating stereoscopic light-field data in accordance with one embodiment of the present disclosure.

For convenience of description, the electronic device ED shown in FIG. 1A is used in the embodiment of FIG. 2, where the multi-view generation circuit 110 and the light-field conversion circuit 120 are implemented by hardware circuits. Additionally, the method 200 in FIG. 3 can be executed by the electronic circuit 130 (including the multi-view generation circuit 110 and the light-field conversion circuit 120) in FIG. 1A or by the processor PR in FIG. 1B. In case the method 200 is executed by the electronic circuit 130, steps 210 and 220 are executed by the multi-view generation circuit 110, and the step 230 is executed by the light-field conversion circuit 120.

In one embodiment, the multi-view generation circuit 110 may receive 3-D image data which include a first texture image and its corresponding first depth image obtained from an internal storage device of the electronic device ED, from an external computer or storage device, or from the network. Each pixel in the first texture image corresponds to each pixel in the depth image. The first texture image is to quantify the perceived texture of the image and thereby provide the information about the spatial arrangement of color or intensities in the image. The depth image is to provide the information relating to the distance of the surfaces of objects in the image from a viewpoint. The first texture image can be a greyscale image or a color image, the present disclosure is not limited thereto. In case the first texture image is a color image, it can be represented in a variety of formats of the color space, such as RGB, YUV, YCbCr, CMYK, sRGB, HSV, etc., the present disclosure is not limited thereto. The depth image can be represented in the form of a depth map, a parallax map, or a point cloud, the present disclosure is not limited thereto.

In another embodiment, the multi-view generation circuit 110 may receive 3-D image data which include a stereoscopic image pair consisting of a left image and a right image.

Step 210: obtaining 3-D image data. In some embodiments, the 3-D image data may include a first texture image and its corresponding first depth image. In some alternative embodiments, the 3-D image data may include a stereoscopic image pair consisting of a left image and a right image.

Step 220: performing a multi-view generation process to convert the 3-D image data into multi-view data.

In some embodiments, the multi-view data may include a second texture image and its corresponding second depth image given that the 3-D image data include the first texture image and its corresponding first depth image. Like the first texture image, the second texture image can also be a greyscale image or a color image represented in a variety of formats of the color space, such as RGB, YUV, YCbCr, CMYK, sRGB, HSV, etc., the present disclosure is not limited thereto. In some alternative embodiments, the multi-view data may include a left multi-view image and a right multi-view image given that the 3-D image data include the stereoscopic image pair consisting of the left image and the right image.

In one embodiment, the multi-view data are arranged into an array having a vertical dimension and a horizontal dimension. The vertical dimension corresponds to a first angular resolution of the left multi-view image and the right multi-view image in a vertical direction. The horizontal dimension corresponds to a second angular resolution of the left multi-view image and the right multi-view image in a horizontal direction.

In one embodiment, processor PR utilizes a graphics processing unit (GPU) to speed up the multi-view generation process.

Figure 4:
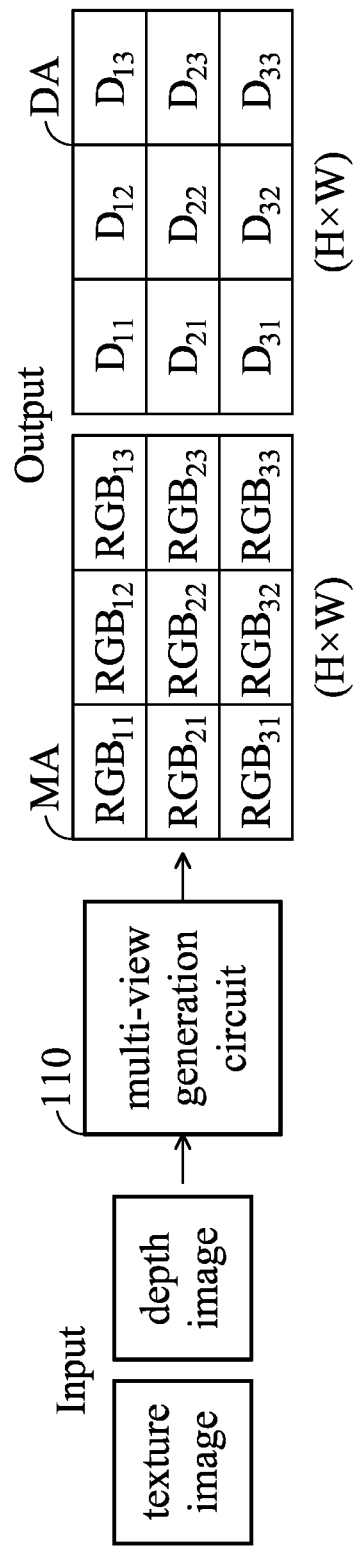
FIG. 4 is a diagram of a multi-view generation circuit in accordance with one embodiment of the present disclosure.

In one embodiment, the second texture image and the corresponding second depth image can respectively be a multi-view data array MA and a depth data array DA, which will be describe with reference to FIG. 4.

Step 230: performing a light-field conversion process to convert the multi-view data into a stereoscopic light-field pair.

In one embodiment, FIG. 4 is a schematic diagram of a multi-view generation circuit 110 in accordance with one embodiment of the present disclosure.

As shown in FIG. 4, the 3-D image data is input into the multi-view generation circuit 110. The image size of the 3-D image data can be, for example, M×N, where the notations M and N are positive integers.

In one embodiment, the multi-view generation circuit 110 places each of the sub-view images (e.g., $RGB_{11}$-$RGB_{33}$) in the corresponding position in a two-dimensional array (e.g., a 3×3 array, but alternatively the array size can be, for example, 4×4, 3×5, 4×2, etc., the present disclosure is not limited thereto) to form the multi-view data array MA (i.e., the second texture image) with an image size of H×W. The sub-view images represent views of the same scene but taken from slightly different view angles. For example, the 3×3 multi-view data array MA as shown in FIG. 4 contains 9 sub-view images $RGB_{11}$-$RGB_{33}$ that represent views of the same scene but taken from 9 different view angles. Collectively, the sub-view images provide texture information for the light-field data. The depth sub-blocks in the 3×3 depth data array DA (e.g., $D_{11}$-$D_{33}$) are also generated in a similar way, so as to form the depth data array DA with an image size of H×W. The notations H and W are positive integers. Typically, the image size of the multi-view data array MA and the corresponding depth data array DA is the same with the image size of the input 3-D image data (i.e., H is equal to M and W is equal to N). In practice, however, H and W each can be set to a number appropriate for displaying the stereoscopic light-field data on the LFD. The multi-view data array MA and the corresponding depth data array DA are subsequently used as the input of the light-field conversion circuit 120, so as to obtain the light-field data.

In one embodiment, the multi-view data array MA (i.e., the second texture image) and the depth data array DA (i.e., the second depth image) are input into the light-field conversion circuit 120, and the light-field conversion circuit 120 outputs a left light field LLF and a right light field RLF.

Figure 5:
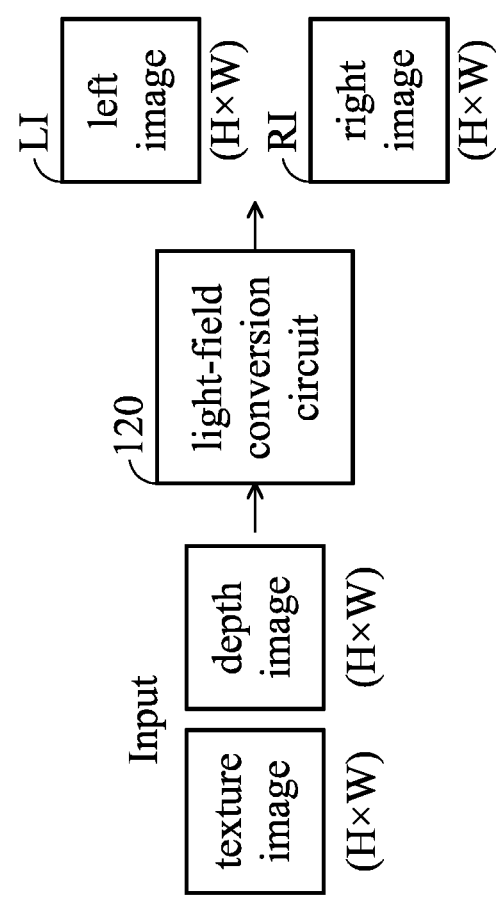
FIGS. 5-6 are diagrams of operations performed by a light-field conversion circuit 120 in accordance with one embodiment of the present disclosure.
Figure 6:
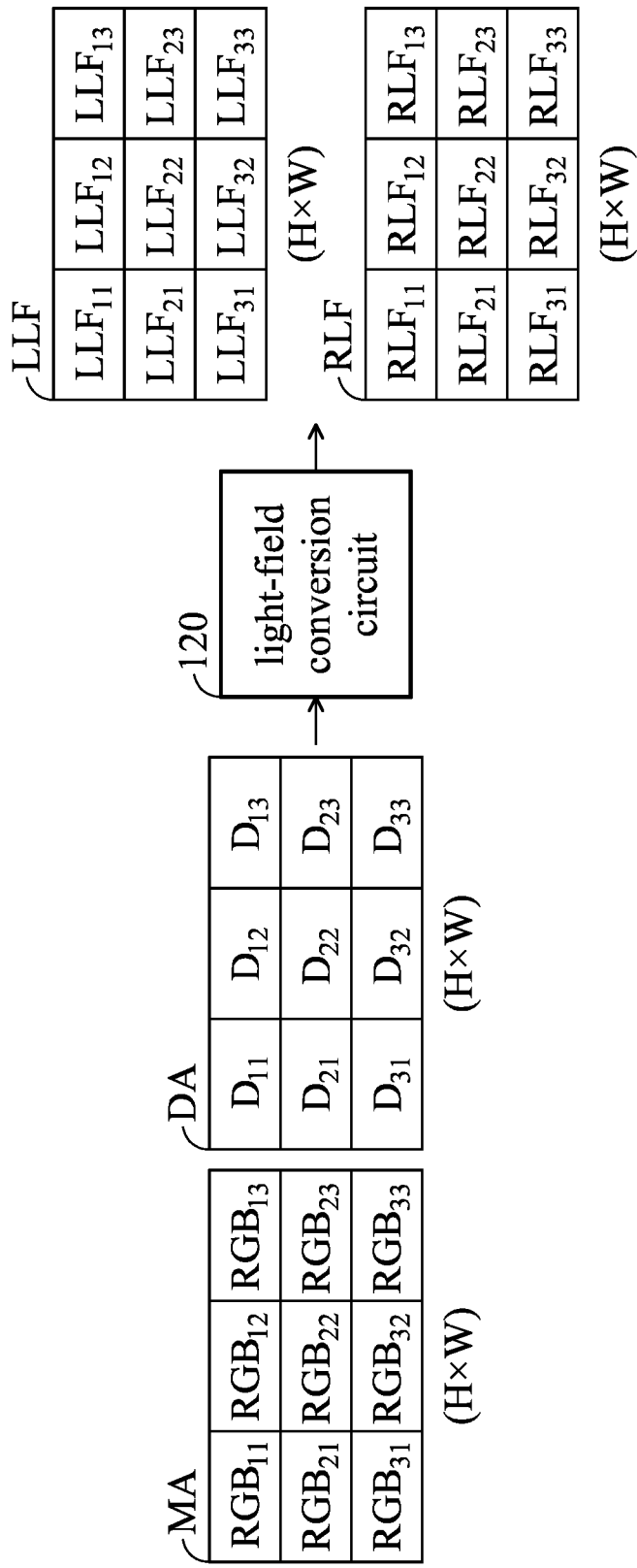

In one embodiment, FIGS. 5-6 are diagrams of operations performed by a light-field conversion circuit 120 in accordance with one embodiment of the present disclosure.

FIG. 5 shows the basic operation of the light-field conversion circuit 120 which converts a single-view image data (e.g., the texture image with the corresponding depth image, both having a height H and a width W) to a stereoscopic image pair consisting of a left image LI and a right image RI. By changing the input of the light-field conversion circuit 120 from the single-view image data into the multi-view data, such as the multi-view data array MA (i.e., the second texture image) and the depth data array DA (i.e., the second depth image) output by the multi-view generation circuit 110 as shown in FIG. 4, the light-field conversion circuit 120 will output a stereoscopic light-field pair instead of the stereoscopic image pair.

FIG. 6 shows an implementation of the present disclosure, where the multi-view data array MA (e.g., $RGB_{11}$-$RGB_{33}$) and the depth data array DA (e.g., $D_{11}$-$D_{33}$) are input into the light-field conversion circuit 120. As shown in FIG. 6, the light-field conversion circuit 120 outputs a left light field LLF (e.g., $LLF_{11}$-$LLF_{33}$) and a right light field RLF (e.g., $RLF_{11}$-$RLF_{33}$) which form a stereoscopic light-field pair.

In one embodiment, the output of multi-view generation circuit 110 can be the multi-view data including the second texture images F(x, u) and the corresponding second depth images D(x, u), u=$u_1$, $u_2$, $u_3$, ... $u_n$. Let the size of F(x, u), I=1, 2, 3, ... n, be H×W. The F and D can be tiled in the x-dimension in to a single image F'(x) and D'(x), respectively. In other words, F'(x+(i−1)W)=F(x, $u_i$) and D'(x+(i−1)W)=D(x, $u_i$). Thus, a tiled left image L'(x) and a tiled right image R'(x) can be generated using following formulas.

$$L'(x) = F'(x + \frac{B_L f}{D'(x)})$$

$$R'(x) = F'(x + \frac{B_R f}{D'(x)})$$

Then, L' and R' can be split into L(x) and R(x) such that L'(x+(i−1)W)=L(x, $u_i$) and R'(x+(i−1)W)=R(x, $u_i$), where $$L(x, u_i) = F(x + \frac{B_L f}{D(x, u_i)}, u_i)$$

$$R(x, u_i) = F(x + \frac{B_R f}{D(x, u_i)}, u_i)$$

L(x, u) and R(x, u) are left light field LLF and right light field RLF that can be input to near-eye light-field displays. $B_L$ is the distance between the pupils to the left. $B_R$ is the distance between the pupils to the right.

In one embodiment, the multi-view generation circuit 110 and the light-field conversion circuit 120 can be implemented using other algorithms well known in the art. Thus, it will not further describe the details herein.

In one embodiment, the left light field LLF and the right light field RLF are displayed by the light field display LFD.

In one embodiment, the left light field LLF and the right light field RLF are respectively displayed by the left display panel and the right display panel of the light field display LFD.

Figure 7:
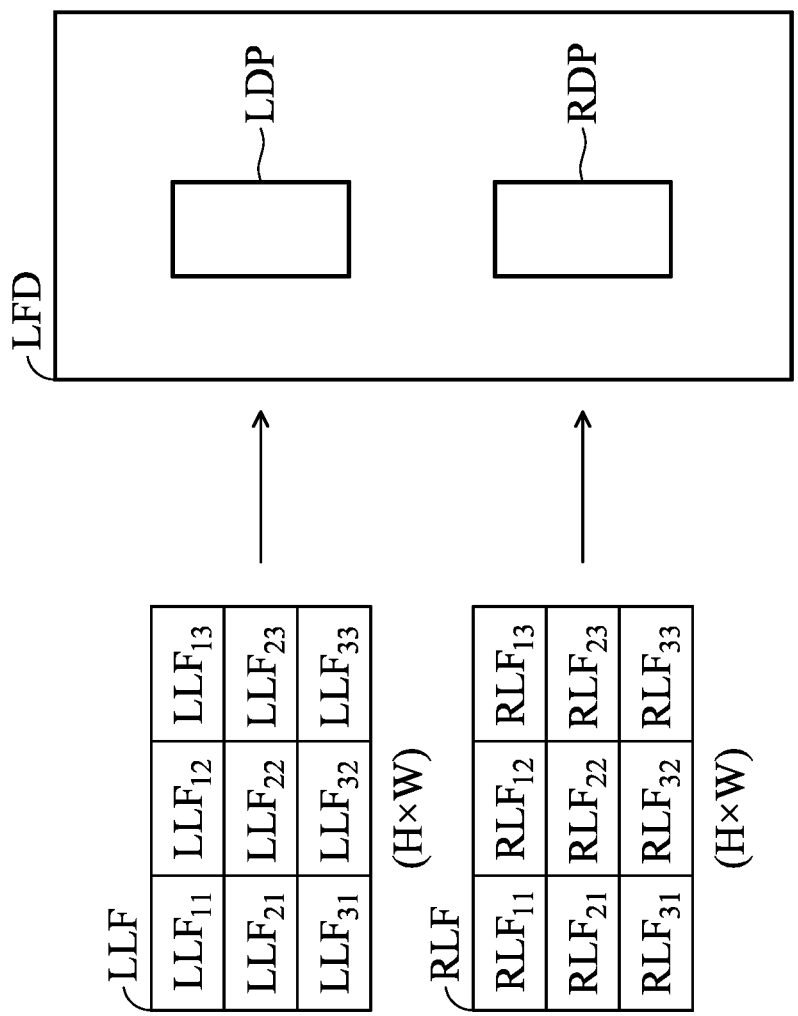
FIG. 7 is a schematic diagram of applying the left light field and the right light field to a light-field display in accordance with one embodiment of the present disclosure.

FIG. 7 is a schematic diagram of applying the left light field LLF and the right light field RLF to a light-field display in accordance with one embodiment of the present disclosure.

In one embodiment, the light-field display LFD may include a left display panel LDP and a right display panel RDP. The light-field conversion circuit 120 transmits the left light field LLF to the left display panel LDP and transmits the right light field RLF to the right display panel RDP.

Thus, the light-field display LFD displays the left light field LLF and the right light field RLF respectively on a left display panel LDP and a right display panel RDP.

To sum up, the embodiments of the present invention provide an electronic device and a method for generating stereoscopic light-field data. The left light field and the right light field can be generated from the 3-D image data through the multi-view generation circuit (or module) and the light-field conversion circuit (or module). The light-field conversion circuit sends the left light field and the right light field to the left display panel and right display panel of the light-field display, respectively. Thereby, when the user watches the left display panel with the left eye and the right display panel with the right eye at the same time, the user can perceive stereoscopic light-field data.

The method of the present invention, or a specific type or part thereof, can exist in the form of code. The code can be included in physical media, such as floppy disks, CDs, hard disks, or any other machine-readable (such as computer-readable) storage media, or not limited to external forms of computer program products. When the program code is loaded and executed by a machine, such as a computer, the machine becomes a device for participating in the present invention. The code can also be transmitted through some transmission media, such as wire or cable, optical fiber, or any transmission type. When the code is received, loaded, and executed by a machine, such as a computer, the machine becomes used to participate in this Invented device. When implemented in a general-purpose processing unit, the program code combined with the processing unit provides a unique device that operates similar to the application of a specific logic circuit.

Although the invention has been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such a feature may be combined with one or more other features of the other implementations as may be desired and advantageous for any given or particular application.

What is claimed is:

1. An electronic device, comprising:
   a multi-view generation circuit, configured to obtain three-dimensional image data and convert the three-dimensional image data into multi-view data; and
   a light-field conversion circuit, configured to convert the multi-view data into a stereoscopic light-field pair;
   wherein the three-dimensional image data comprise a stereoscopic image pair consisting of a left image and a right image;
   wherein the multi-view data comprise a left multi-view image and a right multi-view image;
   wherein the multi-view data are arranged into a two-dimensional array having a vertical dimension and a horizontal dimension;
   wherein the vertical dimension corresponds to a first angular resolution of the left multi-view image and the right multi-view image in a vertical direction; and
   wherein the horizontal dimension corresponds to a second angular resolution of the left multi-view image and the right multi-view image in a horizontal direction.

2. The electronic device of claim 1, wherein the stereoscopic light-field pair comprises a left light field and a right light field, and light-field conversion circuit transmits the left light field and the right light field to a light-field display,
   wherein the light-field display displays the left light field and the right light field respectively on a left display panel and a right display panel of the light-field display.

3. A method for generating stereoscopic light-field data, comprising:
   obtaining three-dimensional image data;
   performing a multi-view generation process to convert the three-dimensional image data into multi-view data; and
   performing a light-field conversion process to convert the multi-view data into a stereoscopic light-field pair;
   wherein the three-dimensional image data comprise a stereoscopic image pair consisting of a left image and a right image;
   wherein the multi-view data comprise a left multi-view image and a right multi-view image;
   wherein the multi-view data are arranged into a two-dimensional array having a vertical dimension and a horizontal dimension;
   wherein the vertical dimension corresponds to a first angular resolution of the left multi-view image and the right multi-view image in a vertical direction; and
   wherein the horizontal dimension corresponds to a second angular resolution of the left multi-view image and the right multi-view image in a horizontal direction.

4. The method for generating stereoscopic light-field data of claim 3, wherein the stereoscopic light-field pair comprises a left light field and a right light field, and the method further comprises the following steps:
   transmitting the left light field and the right light field to a light-field display; and
   displaying the left light field and the right light field respectively on a left display panel and a right display panel of the light-field display.

5. An electronic device, comprising:
   a processor, configured to obtain three-dimensional image data, to perform a multi-view generation process to convert the three-dimensional image data into multi-view data, and to perform a light-field conversion process to convert the multi-view data into a stereoscopic light-field pair;
   wherein the three-dimensional image data comprise a stereoscopic image pair consisting of a left image and a right image;
   wherein the multi-view data comprise a left multi-view image and a right multi-view image;
   wherein the multi-view data are arranged into a two-dimensional array having a vertical dimension and a horizontal dimension;
   wherein the vertical dimension corresponds to a first angular resolution of the left multi-view image and the right multi-view image in a vertical direction; and
   wherein the horizontal dimension corresponds to a second angular resolution of the left multi-view image and the right multi-view image in a horizontal direction.

6. The electronic device of claim 5, wherein the processor utilizes a graphics processing unit (GPU) to speed up the multi-view generation process.

* * * * *